(12) United States Patent
Watson et al.

(10) Patent No.: US 10,655,635 B2
(45) Date of Patent: May 19, 2020

(54) ALUMINUM AIRFOIL

(71) Applicant: United Technologies Corporation, Hartford, CT (US)

(72) Inventors: Thomas J. Watson, South Windsor, CT (US); Daniel A. Bales, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 670 days.

(21) Appl. No.: 14/960,491

(22) Filed: Dec. 7, 2015

(65) Prior Publication Data
US 2016/0153464 A1 Jun. 2, 2016

Related U.S. Application Data

(63) Continuation of application No. 13/362,512, filed on Jan. 31, 2012, now Pat. No. 9,233,414.

(51) Int. Cl.
*F01D 9/04* (2006.01)
*F04D 29/38* (2006.01)
(Continued)

(52) U.S. Cl.
CPC .......... *F04D 29/388* (2013.01); *B21D 53/88* (2013.01); *B23K 1/00* (2013.01); *B23K 1/0018* (2013.01); *B23K 1/19* (2013.01); *B23K 3/08* (2013.01); *B23K 35/002* (2013.01); *B23K 35/0233* (2013.01); *B23K 35/282* (2013.01); *B23K 35/284* (2013.01); *C22C 21/10* (2013.01); *F01D 5/14* (2013.01); *F01D 5/28* (2013.01); *F01D 9/041* (2013.01); *F02C 3/06* (2013.01); *F04D 19/002* (2013.01); *F04D 29/023* (2013.01);
(Continued)

(58) Field of Classification Search
CPC ...... B23K 1/00; B23K 1/0006; B23K 1/0018; B23K 2201/01; F05D 2230/237
USPC ........................ 228/245–248.5, 262.5–262.5; 29/889.1–889.722
See application file for complete search history.

(56) References Cited

U.S. PATENT DOCUMENTS 2,916,815 A 12/1959 Donkervoort et al.
3,063,145 A 11/1962 Bouton
(Continued)

FOREIGN PATENT DOCUMENTS

EP 1767292 3/2007
GB 604194 6/1948
(Continued)

OTHER PUBLICATIONS

International Preliminary Report on Patentability for International Application No. PCT/US2013/020969 dated May 14, 2015.
(Continued)

*Primary Examiner* — Ninh H. Nguyen
*Assistant Examiner* — Maxime M Adjagbe
(74) *Attorney, Agent, or Firm* — Carlson, Gaskey & Olds, P.C.

(57) ABSTRACT

An airfoil includes a first airfoil piece and a second airfoil piece bonded to the first airfoil piece at a joint. The first airfoil piece and the second airfoil piece are formed of aluminum alloys. At least one of the aluminum alloys is an aluminum alloy composition that has greater than 0.8% by weight of zinc.

30 Claims, 2 Drawing Sheets

(51) Int. Cl.

| | | |
|---|---|---|
| *B23K 1/00* | (2006.01) | |
| *B23K 1/19* | (2006.01) | |
| *B23K 3/08* | (2006.01) | |
| *B23K 35/28* | (2006.01) | |
| *B23K 35/00* | (2006.01) | |
| *B23K 35/02* | (2006.01) | |
| *C22C 21/10* | (2006.01) | |
| *F01D 5/28* | (2006.01) | |
| *B21D 53/88* | (2006.01) | |
| *F01D 5/14* | (2006.01) | |
| *F02C 3/06* | (2006.01) | |
| *F04D 19/00* | (2006.01) | |
| *F04D 29/02* | (2006.01) | |
| *F04D 29/32* | (2006.01) | |
| *B23K 101/00* | (2006.01) | |

(52) U.S. Cl.
CPC ...... *F04D 29/324* (2013.01); *B23K 2101/001* (2018.08); *F05D 2220/32* (2013.01); *F05D 2230/237* (2013.01); *F05D 2240/12* (2013.01); *F05D 2300/1616* (2013.01); *F05D 2300/173* (2013.01); *Y10T 29/49622* (2015.01)

(56) References Cited

U.S. PATENT DOCUMENTS

| | | |
|---|---|---|
| 3,356,494 A | 12/1967 | Nikolajs |
| 3,758,233 A | 9/1973 | Cross et al. |
| 5,129,787 A | 7/1992 | Violette et al. |
| 5,242,102 A | 9/1993 | Nicolas |
| 6,109,510 A | 8/2000 | Otsuka et al. |
| 6,222,150 B1 | 4/2001 | Nomura et al. |
| 6,468,040 B1* | 10/2002 | Grylls .............. F01D 5/20 29/889.2 |
| 6,605,370 B2 | 8/2003 | Wittebrood et al. |
| 6,840,435 B2 | 1/2005 | Ohara et al. |
| 7,014,426 B2 | 3/2006 | Schultz |
| 7,226,669 B2* | 6/2007 | Benedictus ........ B23K 1/0012 148/523 |
| 7,694,505 B2 | 4/2010 | Schilling |
| 7,854,252 B2 | 12/2010 | Song et al. |
| 8,052,391 B1 | 11/2011 | Brown |
| 2005/0254955 A1* | 11/2005 | Helder ............... B23K 20/122 416/233 |
| 2008/0095634 A1 | 4/2008 | Kieffer |

FOREIGN PATENT DOCUMENTS

| | | |
|---|---|---|
| GB | 810294 | 3/1959 |
| JP | S62161465 | 7/1987 |
| WO | 9222397 | 12/1992 |

OTHER PUBLICATIONS

Fundamentals of Brazing. ASM International 2003. p. 1.
Gunston, "Jane's Aero-Engines," Pratt & Whitney/USA, Mar. 2000, JAEng—Issue 7, Copyright 2000 by Jane's Information Group Limited, pp. 510-512.
International Search Report for International Application No. PCT/US2013/020969 dated Mar. 26, 2013.
European Search Report for European Patent Application Nol. 13743677 completed Jun. 3, 2016.

* cited by examiner

ALUMINUM AIRFOIL

CROSS-REFERENCE TO RELATED APPLICATION

This application is a Continuation of U.S. patent application Ser. No. 13/362,512 filed on Jan. 31, 2012.

BACKGROUND

Airfoils are known and used in machines, such as gas turbine engines. In an engine, an airfoil may be made of any of various different types of materials, depending upon the operating conditions that the airfoil will be exposed to. Airfoils in relatively cool portions of the engine, such as the fan and compressor sections, can utilize different materials than in relatively hot portions of the engine, such as the turbine section. As an example, certain aluminum or titanium alloys can be used in cooler portions of the engine. For aluminum alloys, there are a wide variety of compositions, each with specific processing limitations that must be met in order to obtain the optimal properties of the alloy. As an example, exposure to elevated processing temperatures can over-age the aluminum alloy and thereby debit the strength and other properties. Given the shape and design requirements of an airfoil, and the processing limitations of aluminum alloys, it has not been possible to use certain aluminum alloys for airfoils.

SUMMARY

An airfoil according to an example of the present disclosure includes a first airfoil piece and a second airfoil piece bonded to the first airfoil piece at a joint. The first airfoil piece and the second airfoil piece are formed of aluminum alloys, and at least one of the aluminum alloys is an aluminum alloy composition comprising greater than 0.8% by weight of zinc.

In a further embodiment of any of the foregoing embodiments, one of the aluminum alloys is the aluminum alloy composition comprising greater than 0.8% by weight of zinc, and the other of the aluminum alloys is a different aluminum alloy composition.

In a further embodiment of any of the foregoing embodiments, the aluminum alloy composition has greater than 7% by weight of zinc, and the different aluminum alloy composition has 0.8% to 5% by weight of zinc.

In a further embodiment of any of the foregoing embodiments, the joint includes a braze element in a higher concentration than in other portions of the first airfoil piece and the second airfoil piece.

In a further embodiment of any of the foregoing embodiments, the aluminum alloy composition includes greater than 4% by weight of the zinc.

In a further embodiment of any of the foregoing embodiments, the joint extends along a neutral axis of the airfoil.

In a further embodiment of any of the foregoing embodiments, the first airfoil piece and the second airfoil piece define a hollow cavity there between.

In a further embodiment of any of the foregoing embodiments, at least one of the first airfoil piece and the second airfoil piece includes an airfoil pressure side surface or an airfoil suction side surface.

In a further embodiment of any of the foregoing embodiments, the first airfoil piece and the second airfoil piece define a cavity there between. The cavity has a series of distinct pockets with at least one insert in at least one of the pockets.

In a further embodiment of any of the foregoing embodiments, the at least one insert includes a foam material.

In a further embodiment of any of the foregoing embodiments, the at least one insert structurally supports at least one of the first airfoil piece or the second airfoil piece.

In a further embodiment of any of the foregoing embodiments, the at least one insert is formed of a non-aluminum alloy.

In a further embodiment of any of the foregoing embodiments, at least one of the first airfoil piece and the second airfoil piece is bonded to the at least one insert.

In a further embodiment of any of the foregoing embodiments, the first airfoil piece includes a leading end, and further comprising a sheath bonded to the first airfoil piece at the leading end.

In a further embodiment of any of the foregoing embodiments, the sheath is formed of a non-aluminum material.

A gas turbine engine according to an example of the present disclosure includes a fan, a compressor section downstream from the fan, a combustor in fluid communication with the compressor section, and a turbine section in fluid communication with the combustor. At least one of the fan or the compressor section includes an aluminum airfoil that has a first airfoil piece and a second airfoil piece bonded to the first airfoil piece at a joint. The first airfoil piece and the second airfoil piece are formed of aluminum alloys, and at least one of the aluminum alloys is an aluminum alloy composition comprising greater than 0.8% by weight of zinc.

In a further embodiment of any of the foregoing embodiments, one of the aluminum alloys is the aluminum alloy composition comprising greater than 0.8% by weight of zinc, and the other of the aluminum alloys is a different aluminum alloy composition.

In a further embodiment of any of the foregoing embodiments, the aluminum alloy composition has greater than 7% by weight of zinc, and the different aluminum alloy composition has 0.8% to 5% by weight of zinc.

In a further embodiment of any of the foregoing embodiments, the joint includes a braze element in a higher concentration than in other portions of the first airfoil piece and the second airfoil piece.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
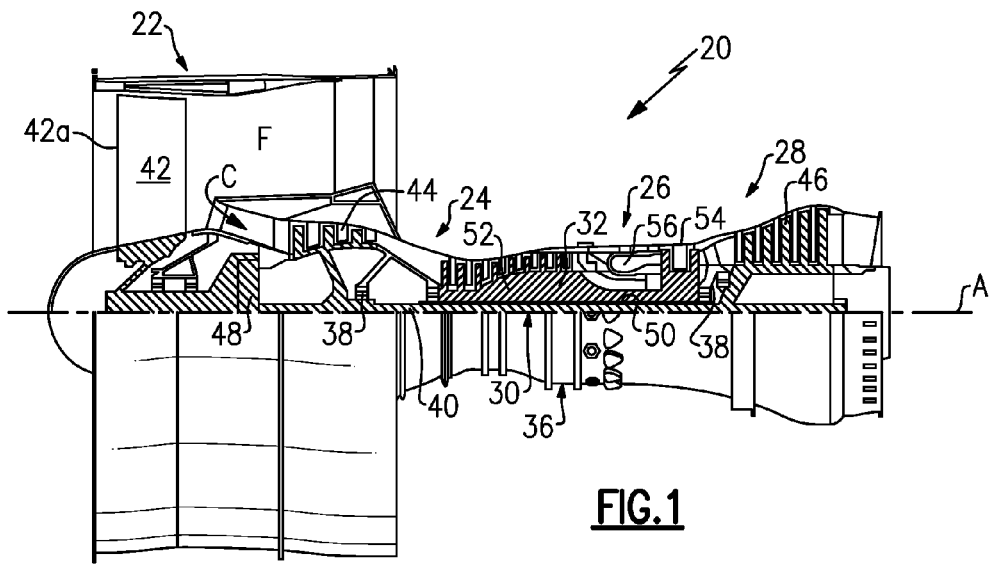
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown), among other systems or features. The fan section 22 drives air along a bypass flowpath F while the compressor section 24 drives air along a core flowpath C for compression and communication into the combustor section 26 and then expansion through the turbine section 28. Although depicted as a turbofan gas turbine engine in the disclosed non-limiting embodiment, it should be understood that the concepts described herein are not limited to use with turbofans and the teachings may be applied to other types of turbine engines, including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30, for example. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figures 2, 3, 5:
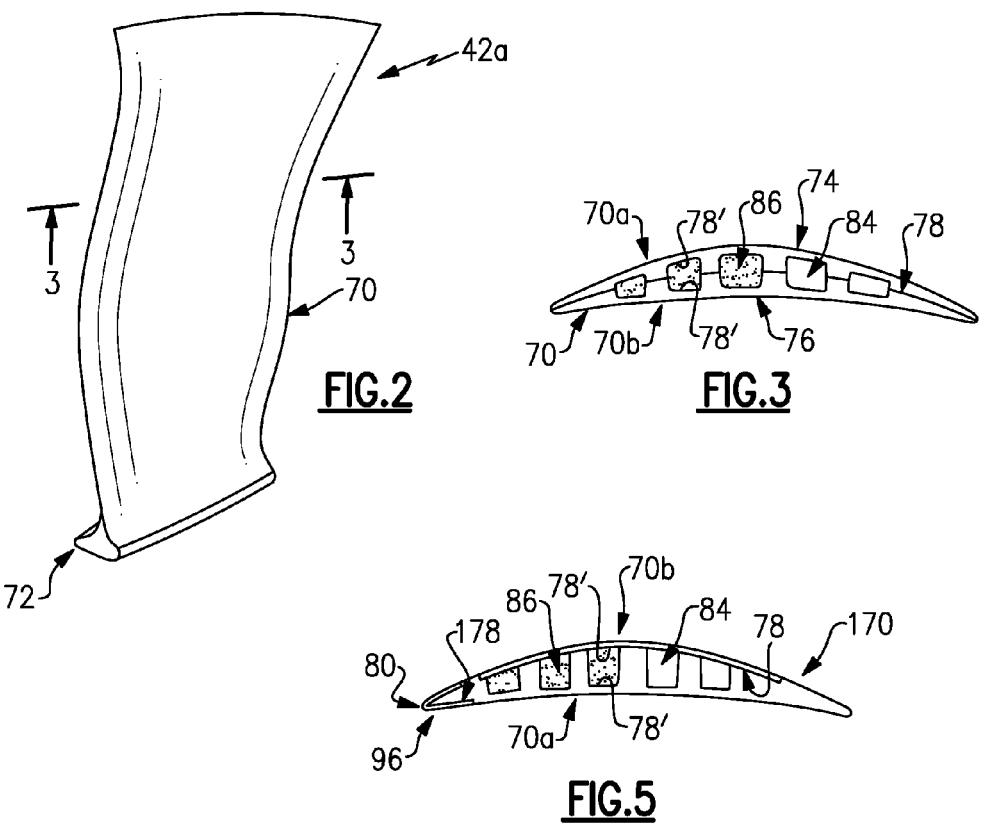
FIG. 2 illustrates an example aluminum airfoil.
FIG. 3 illustrates a cross-sectional view of the aluminum airfoil of FIG. 2.
FIG. 5 illustrates another cross-sectional view of an aluminum airfoil

FIG. 2 illustrates an example aluminum airfoil 42a, which in this example is one of a plurality of airfoil blades or vanes in the fan 42 of the engine 20. As will be described, the aluminum airfoil 42a is made of, at least in part, a brazed, high strength aluminum alloy. Although the aluminum airfoil 42a is described herein with reference to the fan 42, the aluminum airfoil 42a can alternatively be an airfoil blade or vane in the compressor section 24 of the gas turbine engine 20.

As schematically shown, the aluminum airfoil 42a includes an airfoil section 70 and a root section 72 for mounting the aluminum airfoil 42a on a rotor hub. As shown in a cross-sectional view through the airfoil section 70 in FIG. 3, the airfoil section 70 generally has a wing-like shape that provides a lift force via Bernoulli's principle such that the airfoil section 70 includes a pressure side surface 74 and an opposed suction side surface 76.

Referring to FIG. 3, the airfoil section 70 includes a first airfoil piece 70a and a second airfoil piece 70b that is bonded to the first airfoil piece 70a at a braze joint 78 located approximately along the neutral axis of the airfoil. As will be described in further detail below, the braze joint 78 includes an element selected from magnesium and zinc, which assists in bonding the first airfoil piece 70a and the second airfoil piece 70b together. That is, the braze joint 78 includes magnesium, zinc or both in a higher concentration than in other portions of the first airfoil piece 70a and the second airfoil piece 70b.

In the illustrated example in FIG. 3, the first airfoil piece 70a and the second airfoil piece 70b are bonded together. The first airfoil piece 70a includes the pressure side surface 74 and the second airfoil piece 70b includes the suction side surface 76. Thus, in this example, the two pieces 70a and 70b form the complete airfoil shape. It is to be understood that in other embodiments, the pieces 70a and 70b may not form the complete airfoil shape and additional pieces can be used to partially or fully form the airfoil shape.

In this embodiment shown in FIG. 3, the first airfoil piece 70a and the second airfoil piece 70b are shaped such that upon brazing of the pieces 70a and 70b, there is a cavity 84 enclosed between the pieces 70a and 70b. Thus, the airfoil section 70 is hollow, to reduce weight and/or provide mistuning of the airfoil. Additionally, the first airfoil piece 70a and the second airfoil piece 70b each may include a series of "pockets" that form a portion of the cavities 84. In another example (see FIG. 5), the first airfoil piece 70a includes similar "pockets" that form cavities 84 and the second airfoil piece 70b is a cover over the pockets.

Optionally, the airfoil section 70 includes an insert 86 (shown schematically in FIGS. 3 and 5) located within the cavity 84. For example, the insert 86 is a structural piece that reinforces the hollow structure of the airfoil section 70. In embodiments, the insert 86 includes a spar, foam material or both that structurally supports one or more of the pieces 70a and 70b.

In one embodiment, as shown in FIGS. 3 and 5, the insert 86 is metallic and is also bonded with the first airfoil piece 70a, the second airfoil piece 70b or both at braze joints 78'. Thus, the insert 86 is also considered herein to be an airfoil piece.

As an indicated above, the airfoil section 70 is made, at least in part, by a high strength aluminum alloy. In one example, at least one of the first airfoil piece 70a, the second airfoil piece 70b or the insert 86 is made of a high strength aluminum alloy composition that includes greater than 0.8% by weight of zinc. In a further example, the aluminum alloy composition is a 7000 series aluminum alloy. In further examples, the aluminum alloy composition includes greater than 4% by weight of the zinc, greater than 5% by weight of the zinc or greater than 7% by weight of the zinc. In further embodiments, the first airfoil piece 70a, the second airfoil piece 70b and the insert 86 are all made of the aluminum alloy composition. In other embodiments, at least one of the first airfoil piece 70a, the second airfoil piece 70b or the insert 86 is made of a different aluminum alloy composition or a non-aluminum alloy composition.

At least due in part to the presence of the zinc in the aluminum alloy composition, the aluminum alloy presents challenges in processing to form a reliable airfoil. For example, one challenge is braze bonding of the aluminum alloy composition. Typical braze materials, such as aluminum-silicon materials, that are generally used to braze aluminum structures melt at significantly higher temperatures than the melting point of the zinc-containing aluminum alloy composition of the aluminum airfoil 42a. Thus, as will be described below with regard to a method of making the aluminum airfoil 42a, a braze material that includes at least one of relatively low melting temperature elements of magnesium and zinc is used to enable brazing.

FIGS. 4A-D show portions of the first airfoil piece 70a and the second airfoil piece 70b during through a method of making the aluminum airfoil 42a and braze joint 78. It is to be understood that although this example is described with reference to the first airfoil piece 70a and the second airfoil piece 70b, the method is also applicable to brazing between the first airfoil piece 70a and the insert 86 and/or the second airfoil piece 70b and the insert 86 to form braze joints 78'.

Figure 4A:
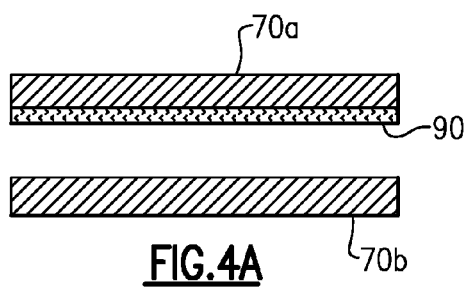
FIG. 4A illustrates a portion of aluminum airfoil pieces in a method of making an aluminum airfoil.

As shown in FIG. 4A, the first airfoil piece 70a and the second airfoil piece 70b (each shown in part) are initially separate and distinct pieces. In this example, a braze material 90 is applied onto a surface of the first airfoil piece 70a at a location which is to be brazed to the second airfoil piece 70b. Alternatively, the braze material 90 is applied to the second airfoil piece 70b or both pieces 70a and 70b. In one example, the braze material 90 is applied only to the surface location at which the first airfoil piece 70a and the second airfoil piece 70b are to be bonded together. Thus, the remaining surfaces, such as the inner surfaces that form the cavity 84, do not include any braze material 90 and the amount of braze material 90 used is minimized. The braze material 90 may be deposited as a layer using a cathodic arc coating deposition process, although other types of deposition processes can alternatively be used, such as but not limited to electroless, electrolytic, vapor or mechanical (powder). Areas that are not to be bonded can be masked off during deposition of the braze material 90 and/or removed by etching, if needed.

In one embodiment, the braze material 90 has a composition that includes magnesium and zinc. In one example composition, the braze material 90 is a magnesium-zinc alloy that includes 40 to 65 weight percent zinc and a balance of magnesium. In a another example, the braze material 90 includes 93 to 100% by weight of zinc and a balance of magnesium. In a further embodiment, the braze material 90 also includes aluminum. For example, the braze material 90 includes greater than 54% by weight zinc and a balance of aluminum. In another alternative, relatively pure zinc is applied as the braze material 90. It is to be understood that the composition of the braze material 90 with regard to the amount of magnesium and/or zinc and/or aluminum can be modified to change the melting temperature of the braze material 90. Thus, the melting temperature can be modified to meet a temperature target for a particular brazing process and/or for greater compatibility with the aluminum alloy composition of the airfoil pieces 70a and 70b (or 86).

Figure 4B:
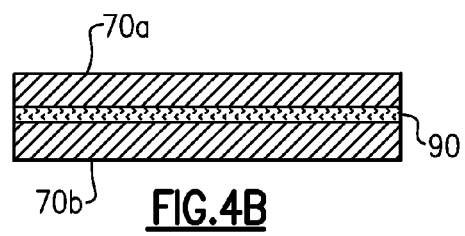
FIG. 4B illustrates aluminum airfoil pieces in a method of making an aluminum airfoil.

Referring to FIG. 4B, the first airfoil piece 70a and the second airfoil piece 70b are brought together into contact. For example, the first airfoil piece 70a and the second airfoil piece 70b are brought together such that the braze material 90 on the first airfoil piece 70a is in contact with the bonding surface of the second airfoil piece 70b.

In a further example, the first airfoil piece 70a and the second airfoil piece 70b are brought together using a metallic vacuum bag. In this example, the first airfoil piece 70a and the second airfoil piece 70b are placed into a vacuum bag, which is then evacuated to a final negative pressure with regard to the ambient surrounding environmental pressure such that the bag presses the airfoil pieces 70a and 70b together. In one example, the final pressure is approximately negative one atmosphere. The process of evacuating the bag may include flushing the interior of the bag with an inert gas, such as argon. For instance, the bag is flushed multiple times with argon to substantially remove any undesired gases, such as oxygen.

Alternatively, the first airfoil piece 70a and the second airfoil piece 70b are placed into a die that generally conforms to the shape of the airfoil pieces 70a and 70b. The die is then closed to press the first airfoil piece 70a and the second airfoil piece 70b together. Similar to the vacuum bag technique, the interior of the die may be flushed with an inert gas, such as argon. The compression of the airfoil pieces 70a and 70b in the die also serves to coin the airfoil pieces 70a and 70b to assure a proper geometry.

Figure 4D:
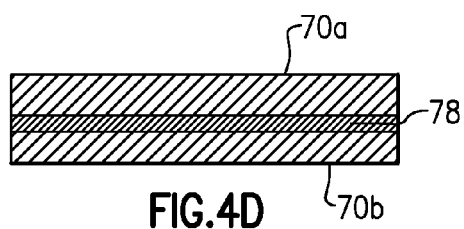
FIG. 4D illustrates aluminum airfoil pieces in a method of making an aluminum airfoil.
Figure 4C:
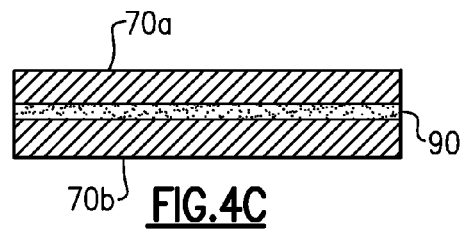
FIG. 4C illustrates aluminum airfoil pieces in a method of making an aluminum airfoil.

Referring to FIG. 4C, the first airfoil piece 70a, the second airfoil piece 70b and the braze material 90 are then heated at a predetermined brazing temperature. In the vacuum bag technique, for example, the vacuum bag and airfoil piece 70a and 70b are placed within a heating chamber. Alternatively, for the die technique, the die is heated at the desired predetermined brazing temperature.

The predetermined brazing temperature is selected to at least partially melt the braze material 90, while the first airfoil piece 70a and the second airfoil piece 70b remain unmelted. In one example, the predetermined brazing temperature is 450-550° C. to melt the braze material 90 but not melt the aluminum alloy composition of the first airfoil piece 70a, the second airfoil piece 70b or both.

As indicated above, high strength aluminum alloy compositions that include greater than 0.8% by weight of zinc melt at a relatively low temperature in comparison to other aluminum alloys. As an example based upon aluminum alloy 7255, the high strength aluminum alloy melts at approximately 514° C. Thus, the composition of the braze material 90 is selected such that its melting temperature is lower than the melting temperature of the aluminum alloy of the first airfoil piece 70a, the second airfoil piece 70b or both.

In a further example, the predetermined brazing temperature is above a solutionizing temperature of the aluminum alloy composition of the first airfoil piece 70a, the second airfoil piece 70b or both. The solutionizing temperature is the temperature above which any alloying elements "dissolve" into solid solution with the aluminum. In one example, the solutionizing temperature of the aluminum alloy composition having greater than 0.8% by weight of zinc is greater than approximately 475° C. Thus, the selected predetermined brazing temperature is above the solutionizing temperature such that the brazing process also serves as a solutionizing heat treatment for the aluminum alloy composition.

Referring also to FIG. 4D, as the braze material 90 melts, the magnesium and/or zinc diffuses into the first airfoil piece 70a and the second airfoil piece 70b. For example, the brazing temperature is held for a predetermined amount of time to adequately diffuse the braze material. In a further example, the hold time is minimized to limit the formation of intermetallic phases. Upon sufficient diffusion, the braze joint 78 isothermally solidifies. As an example, the diffusion of the magnesium and/or zinc from the liquid braze material 90 into the airfoil pieces 70a and 70b causes the composition of the liquid braze material 90 to change and isothermally solidify. That is, as the magnesium and/or zinc diffuses, the composition of the braze material 90 changes to a composition that has a higher melting point.

After solidification of the braze joint 78, the aluminum airfoil 42a is then quench cooled. As indicated above, the brazing is conducted at a temperature that is above the solutionizing temperature of the aluminum alloy composition of the first airfoil piece 70a, the second airfoil piece 70b or both. In one example, the rate of cooling is controlled to control precipitation. The cooling rate should be sufficiently high such that the aluminum alloy is adequately solution heat-treated to achieve the required properties for a specific application/design.

In a further example, the aluminum airfoil 42a is cooled using a cooling fluid, such as a gas. For instance, argon gas is blown over the aluminum airfoil 42a at a relatively high rate. In an example based on the vacuum bag technique, the argon gas is forced onto a metallic bag which is in intimate contact with the aluminum airfoil 42a. The intimate contact between the metallic bag and the aluminum airfoil 42a is assured by the negative atmospheric pressure within the metallic bag in which the aluminum airfoil 42a resides. The intimate contact ensures rapid cooling of the aluminum airfoil 42a such that adequate solution heat-treatment is achieved.

In a further example, the aluminum airfoil 42a is then further subjected to a controlled aging heat treatment to produce a desirable amount of precipitation and thereby strengthen the aluminum alloy composition. Thus, the brazing process to make the aluminum airfoil 42a substantially avoids precipitation so that the later controlled aging heat treatment can be used to produce a desirable microstructure to obtain target final properties of the aluminum airfoil 42a.

Figure 6:
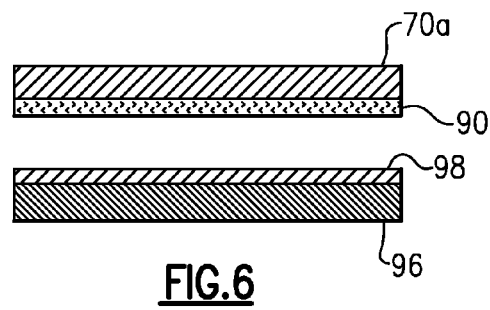
FIG. 6 illustrates a portion of a non-aluminum alloy airfoil piece before brazing to an aluminum airfoil piece.

FIG. 5 illustrates another example airfoil section 170 that may be used as an alternative in the aluminum airfoil 42a. In this example, the airfoil section 170 also includes the first airfoil piece 70a and the second airfoil piece 70b. However, a sheath 96 is bonded to the first airfoil piece 70a at the leading end 80. In this example, the sheath 96 is made of a non-aluminum material, such as a titanium alloy or steel. Typically, dissimilar metals or metal alloys cannot be brazed together. However, as shown in FIG. 6, the portions of the sheath 90 that are to be bonded to the first airfoil piece 70a and the second airfoil piece 70b include an aluminum layer 98 that allows the sheath 96 to be brazed to the first airfoil piece 70a and the second airfoil piece 70b. Alternatively, if the non-aluminum material of the sheath 96 is compatible with the braze material 90 such that the braze material 90 wets the non-aluminum material upon melting, the aluminum layer 98 can be excluded.

FIG. 6 shows portions of the sheath 96 and the first airfoil piece 70a prior to brazing. Similar to the brazing process as described with reference to FIG. 4A, the first airfoil piece 70a is provided with a braze material 90 for brazing/bonding with the sheath 96. The sheath 96 includes, at least on surfaces that are to be bonded, the aluminum layer 98. In embodiments, the aluminum layer 98 is relatively pure aluminum or an aluminum alloy that includes a greater than 0.8% by weight of zinc, similar to the composition used for the first airfoil piece 70a in this example. Alternatively, the braze material 90 can be applied on top of the aluminum layer 98 on the sheath 96. Similar to the brazing process as described with reference to FIGS. 4B-D, the first airfoil piece 70a and the sheath 96 are then brought together, heated, and cooled to form a braze joint 178 (FIG. 5). In this regard, the aluminum layer 98 on the dissimilar metal of the sheath 96 permits the sheath 96 and the airfoil piece 70a to be bonded together. In a further example, the brazing of the sheath 96 is conducted concurrently with the brazing to form braze joints 78, as described above.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
    a first airfoil piece; and
    a second airfoil piece bonded to the first airfoil piece at a joint,
        the first airfoil piece and the second airfoil piece being formed of aluminum alloys, and at least one of the aluminum alloys is an aluminum alloy composition comprising greater than 0.8% by weight of zinc.

2. The airfoil as recited in claim 1, wherein one of the aluminum alloys is the aluminum alloy composition comprising greater than 0.8% by weight of zinc, and the other of the aluminum alloys is a different aluminum alloy composition.

3. The airfoil as recited in claim 2, wherein the aluminum alloy composition has greater than 7% by weight of zinc, and the different aluminum alloy composition has 0.8% to 5% by weight of zinc.

4. The airfoil as recited in claim 2, wherein the joint includes a braze element in a higher concentration than in other portions of the first airfoil piece and the second airfoil piece.

5. The airfoil as recited in claim 1, wherein the aluminum alloy composition includes greater than 4% by weight of the zinc.

6. The airfoil as recited in claim 1, wherein the joint extends along a neutral axis of the airfoil.

7. The airfoil as recited in claim 1, wherein the first airfoil piece and the second airfoil piece define a hollow cavity there between.

8. The airfoil as recited in claim 1, wherein at least one of the first airfoil piece and the second airfoil piece includes an airfoil pressure side surface or an airfoil suction side surface.

9. The airfoil as recited in claim 1, wherein the first airfoil piece and the second airfoil piece define a cavity there between, the cavity having a series of distinct pockets with at least one insert in at least one of the pockets.

10. The airfoil as recited in claim 9, wherein the at least one insert includes a foam material.

11. The airfoil as recited in claim 9, wherein the at least one insert structurally supports at least one of the first airfoil piece or the second airfoil piece.

12. The airfoil as recited in claim 9, wherein the at least one insert is formed of a non-aluminum alloy.

13. The airfoil as recited in claim 9, wherein at least one of the first airfoil piece and the second airfoil piece is bonded to the at least one insert.

14. The airfoil as recited in claim 1, wherein the first airfoil piece includes a leading end, and further comprising a sheath bonded to the first airfoil piece at the leading end.

15. The airfoil as recited in claim 14, wherein the sheath is formed of a non-aluminum material.

16. The airfoil as recited in claim 1, wherein the joint is a first braze joint, and the first braze joint includes magnesium, zinc, or both in a higher concentration than in other portions of the first airfoil piece and the second airfoil piece.

17. The airfoil as recited in claim 16, wherein the aluminum alloy composition includes greater than 4% by weight of the zinc.

18. The airfoil as recited in claim 17, wherein the first airfoil piece and the second airfoil piece form a hollow structure that defines a cavity, the hollow structure having at least one insert within the cavity reinforcing the hollow structure, and the insert is bonded with the first airfoil piece, the second airfoil piece, or both at one or more second braze joints.

19. The airfoil as recited in claim 18, wherein the second braze joint includes magnesium, zinc, or both in a higher concentration than in other portions of the first airfoil piece, the second airfoil piece, and the insert.

20. The airfoil as recited in claim 16, wherein the aluminum alloy composition includes greater than 7% by weight of the zinc.

21. The airfoil as recited in claim 1, wherein the joint is a braze joint, and the braze joint includes magnesium in a higher concentration than in other portions of the first airfoil piece and the second airfoil piece.

22. The airfoil as recited in claim 1, wherein the joint is a braze joint, and the braze joint includes zinc in a higher concentration than in other portions of the first airfoil piece and the second airfoil piece.

23. A gas turbine engine comprising:
a fan;
a compressor section downstream from the fan;
a combustor in fluid communication with the compressor section; and
a turbine section in fluid communication with the combustor, and at least one of the fan or the compressor section including an aluminum airfoil that has a first airfoil piece and a second airfoil piece bonded to the first airfoil piece at a joint, the first airfoil piece and the second airfoil piece being formed of aluminum alloys, and at least one of the aluminum alloys is an aluminum alloy composition comprising greater than 0.8% by weight of zinc.

24. The engine as recited in claim 23, wherein one of the aluminum alloys is the aluminum alloy composition comprising greater than 0.8% by weight of zinc, and the other of the aluminum alloys is a different aluminum alloy composition.

25. The engine as recited in claim 24, wherein the aluminum alloy composition has greater than 7% by weight of zinc, and the different aluminum alloy composition has 0.8% to 5% by weight of zinc.

26. The engine as recited in claim 24, wherein the joint includes a braze element in a higher concentration than in other portions of the first airfoil piece and the second airfoil piece.

27. The engine as recited in claim 23, wherein the joint is a first braze joint, and the first braze joint includes magnesium, zinc, or both in a higher concentration than in other portions of the first airfoil piece and the second airfoil piece.

28. The engine as recited in claim 27, wherein the aluminum alloy composition includes greater than 4% by weight of the zinc.

29. The engine as recited in claim 28, wherein the first airfoil piece and the second airfoil piece form a hollow structure that defines a cavity, the hollow structure having at least one insert within the cavity reinforcing the hollow structure, and the insert is bonded with the first airfoil piece, the second airfoil piece, or both at one or more second braze joints.

30. The engine as recited in claim 29, wherein the second braze joint includes magnesium, zinc, or both in a higher concentration than in other portions of the first airfoil piece, the second airfoil piece, and the insert.

* * * * *